United States Patent
Kato (10) Patent No.: US 6,793,137 B2
(45) Date of Patent: Sep. 21, 2004

(54) OPTICAL SCANNER AND IMAGE FORMING APPARATUS

(75) Inventor: Manabu Kato, Toda (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/264,222

(22) Filed: Oct. 4, 2002

(65) Prior Publication Data

US 2003/0066888 A1 Apr. 10, 2003

Related U.S. Application Data

(62) Division of application No. 09/576,540, filed on May 23, 2000, now Pat. No. 6,607,129.

(30) Foreign Application Priority Data

May 25, 1999 (JP) ............................................ 11-144736

(51) Int. Cl.[7] ................................................. G06K 7/10
(52) U.S. Cl. ............................ 235/462.25; 235/462.01; 235/472.01
(58) Field of Search ....................... 235/462.01–462.47, 235/472.01, 472.02, 472.03, 454, 455, 494

(56) References Cited

U.S. PATENT DOCUMENTS

| | | | |
|---|---|---|---|
| 3,946,150 A | 3/1976 | Grafton | 178/6.7 R |
| 5,220,449 A | 6/1993 | Kuroda | 359/196 |
| 5,235,349 A | 8/1993 | Yamazaki | 346/108 |
| 5,498,869 A * | 3/1996 | Appel et al. | 250/236 |
| 5,519,432 A * | 5/1996 | Genovese | 347/260 |
| 5,748,352 A * | 5/1998 | Hattori | 359/196 |
| 5,757,413 A | 5/1998 | Andrews | 347/256 |
| 5,757,532 A | 5/1998 | Takanashi | 359/196 |
| 6,026,201 A * | 2/2000 | Hattori | 382/312 |
| 6,208,450 B1 * | 3/2001 | Toyoda | 359/205 |
| 6,259,547 B1 * | 7/2001 | Kamikubo | 359/205 |
| 6,324,013 B1 * | 11/2001 | Nakai | 359/641 |
| 2001/0035943 A1 | 11/2001 | Kato | 355/52 |

FOREIGN PATENT DOCUMENTS

| | | |
|---|---|---|
| EP | 0 783 125 A2 | 7/1997 |
| EP | 0 872 754 A1 | 10/1998 |
| EP | 0 898 192 A2 | 2/1999 |
| JP | 3-206478 | 9/1991 |
| JP | 9-120035 | 5/1997 |
| JP | 9-325289 | 12/1997 |

* cited by examiner

Primary Examiner—Thien M. Le
(74) Attorney, Agent, or Firm—Fitzpatrick, Cella, Harper & Scinto

(57) ABSTRACT

An optical scanner to be used for an image forming apparatus such as a digital copying machine comprises a light source such as a semiconductor laser for emitting a light beam, a deflection element such as a rotary polygon mirror for deflecting the emitted light beam, and an imaging optical system for focusing the deflected light beam on a surface to be scanned, typically a photosensitive drum surface. The imaging optical system includes at least first and second optical elements as well as a reflector mirror arranged on the optical path between the first optical element and the second optical element for reflecting the light beam coming from the former and leading it to the latter so that any displacement of the scanning spot in the sub-scanning direction may effectively be eliminated.

3 Claims, 10 Drawing Sheets

OPTICAL SCANNER AND IMAGE FORMING APPARATUS

CROSS-REFERENCE TO RELATED APPLICATION

This application is a divisional of application Ser. No. 09/576,540, filed May 23, 2000 now U.S. Pat. No. 6,607,129.

BACKGROUND OF THE INVENTION

1. Field of the Invention

This invention relates to an optical scanner and also to an image forming apparatus. More particularly, the present invention relates to an optical scanner adapted to deflect the light beam emitted from a light source and cause it to scan the surface of an object of scanning by way of an imaging optical system. Such an optical scanner can suitably be used for a laser beam printer (LBP) or a digital copying machine designed to form an image of an object by way of an electrophotographic process.

2. Related Background Art

Optical scanners to be used for image-forming apparatuses including laser beam printers and digital copying machines are adapted to cyclically deflect a light beam emitted from a light source and optically modulated in accordance with an image signal by means of an optical deflector such as a rotary polygon mirror, converge the light beam to a spot of light on the surface of a photosensitive recording medium (photosensitive drum) by means of an imaging optical system having a so-called fθ feature and cause the light beam to scan the surface in order to record image information.

Figure 1:
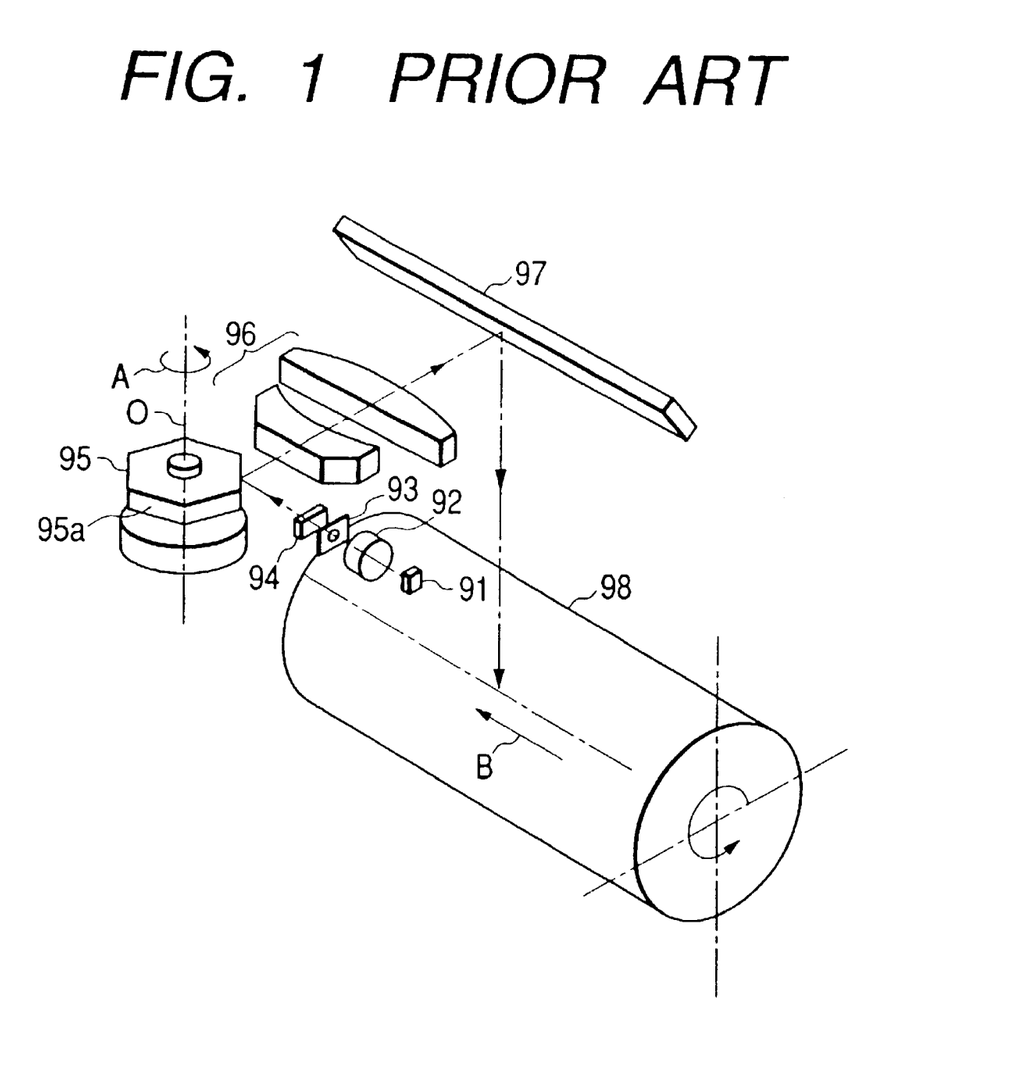
FIG. 1 is a schematic perspective view of a known optical scanner, illustrating a principal portion thereof.

FIG. 1 of the accompanying drawings is a schematic perspective view of such a known typical optical scanner.

Referring to FIG. 1, the divergent light beam emitted from a light source 91 is substantially collimated by a collimator lens 92 and then its width is limited by an aperture 93. After passing through the aperture 93, the light beam is made to enter a cylindrical lens 94 having a predetermined refractive power only in the sub-scanning direction. The substantially collimated light beam entering the cylindrical lens 94 leaves the latter, keeping the substantially collimated condition in the main-scanning section (i.e. a plane intersecting it along the main-scanning direction). However, it is converged in the sub-scanning section (i.e. a plane intersecting it along the sub-scanning direction) and then focused on a deflecting surface (reflecting surface) 95a of an optical deflector 95, which is a rotary polygon mirror, to produce a substantially linear image. Then, the light beam deflected/reflected by the deflecting surface 95a of the optical deflector 95 is focused on the surface of a photosensitive drum 98 to be scanned by way of an imaging optical system (fθ lens) 96 having an fθ feature and a fold mirror 97 and made to optically scan the surface of the photosensitive drum 98 in the direction of arrow B (main-scanning direction) as the optical deflector 95 is rotated in the sense of arrow A in order to record image information thereon.

Figure 2:
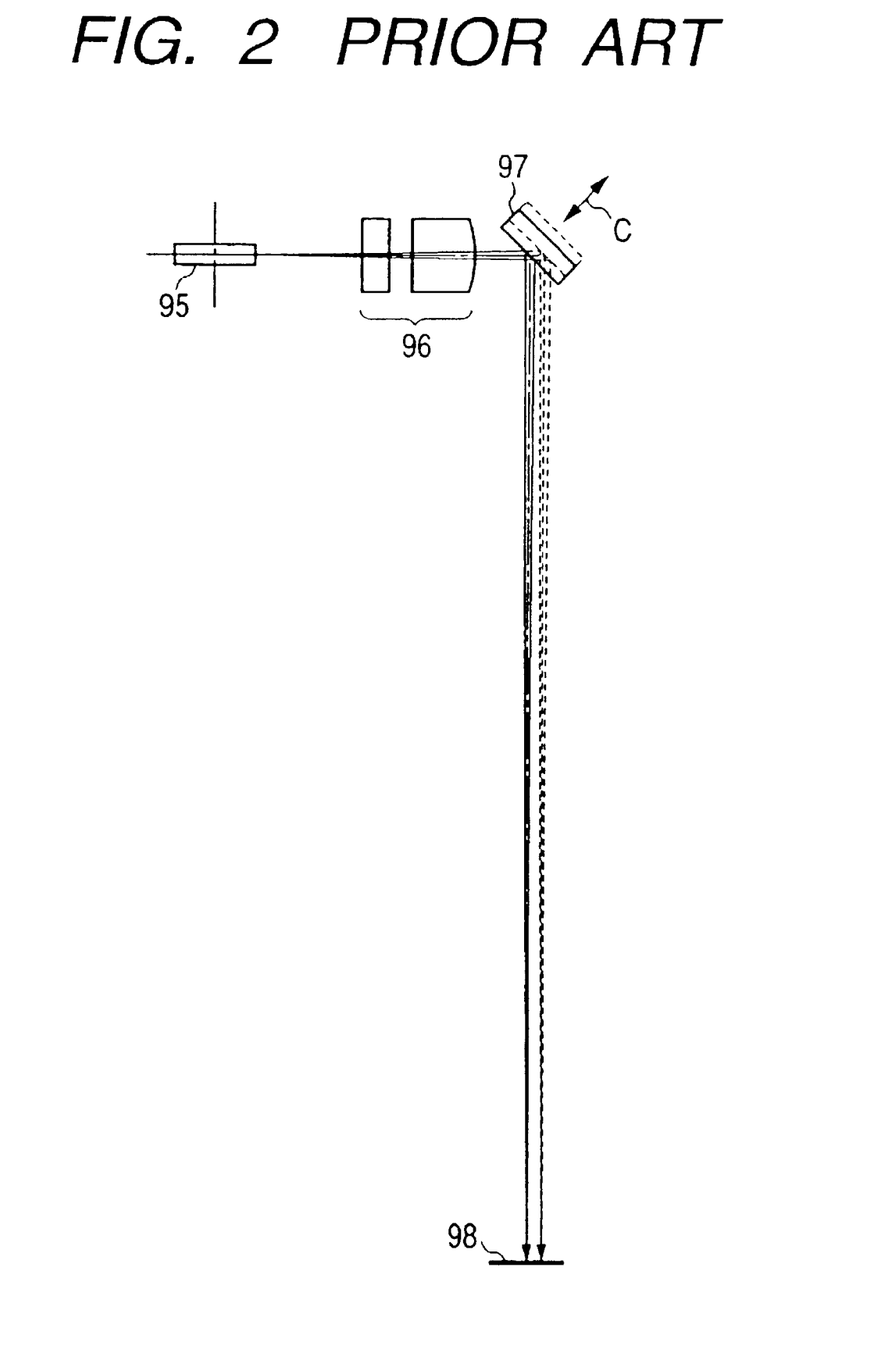
FIG. 2 is a schematic cross sectional view of the known optical scanner taken along the sub-scanning direction.

FIG. 2 is a schematic cross sectional view of a principal portion of the known optical scanner of FIG. 1 taken along the sub-scanning direction. In FIG. 2, the components same as those of FIG. 1 are denoted respectively by the same reference symbols and would not be described any further.

Referring to FIG. 2, the fold mirror 97 is typically secured to a holder member fitted to the optical cabinet or the main frame of the optical scanner. Such a holder member is reinforced to improve its rigidity and make it free from the vibrations produced by the motor of the optical deflector and that of the paper feeding system in the main frame. The fold mirror itself may be reinforced by means of a plate bonded thereto in order to improve its rigidity and shift its resonance frequency. However, it is highly difficult to completely eliminate the oscillation of the fold mirror by reinforcing the holder member and improving its rigidity.

FIG. 2 illustrates the movement of the scanning spot in the sub-scanning direction when the fold mirror 97 is oscillated in the direction of arrow C (direction of primary oscillation). When the incident light beam is deflected (reflected) by 90 degrees in the sub-scanning section, the scanning spot is moved on the surface being scanned (the surface of the image carrier which may be a photosensitive drum) 98 by an amount equal to the amplitude of the oscillation of the fold mirror 97. Then, as a result, the oscillation is visualized as an irregular pitch of scanning lines in the sub-scanning direction on the obtained image to remarkably degrade the image quality.

SUMMARY OF THE INVENTION

Therefore, it is the object of the present invention to provide an optical scanner and an image forming apparatus that can correct any displacement of the scanning spot in the sub-scanning direction due to the oscillation of the fold mirror and produce a high quality image that is free from an irregular pitch of scanning lines without resorting to costly anti-vibration means for the main frame and/or the optical cabinet of the optical scanner.

According to the invention, the above object is achieved by providing an optical scanner comprising:

a light source;

a deflection element for deflecting the light beam emitted from the light source;

a scanning optical system including at least first and second optical elements and adapted to focus the light beam deflected by the deflection element on the surface to be scanned; and a reflector mirror arranged on the optical path between the first optical element and the second optical element to reflect the light beam coming from the first optical element and lead it to the second optical element.

DESCRIPTION OF THE PREFERRED EMBODIMENTS

Embodiment 1

Figure 3:
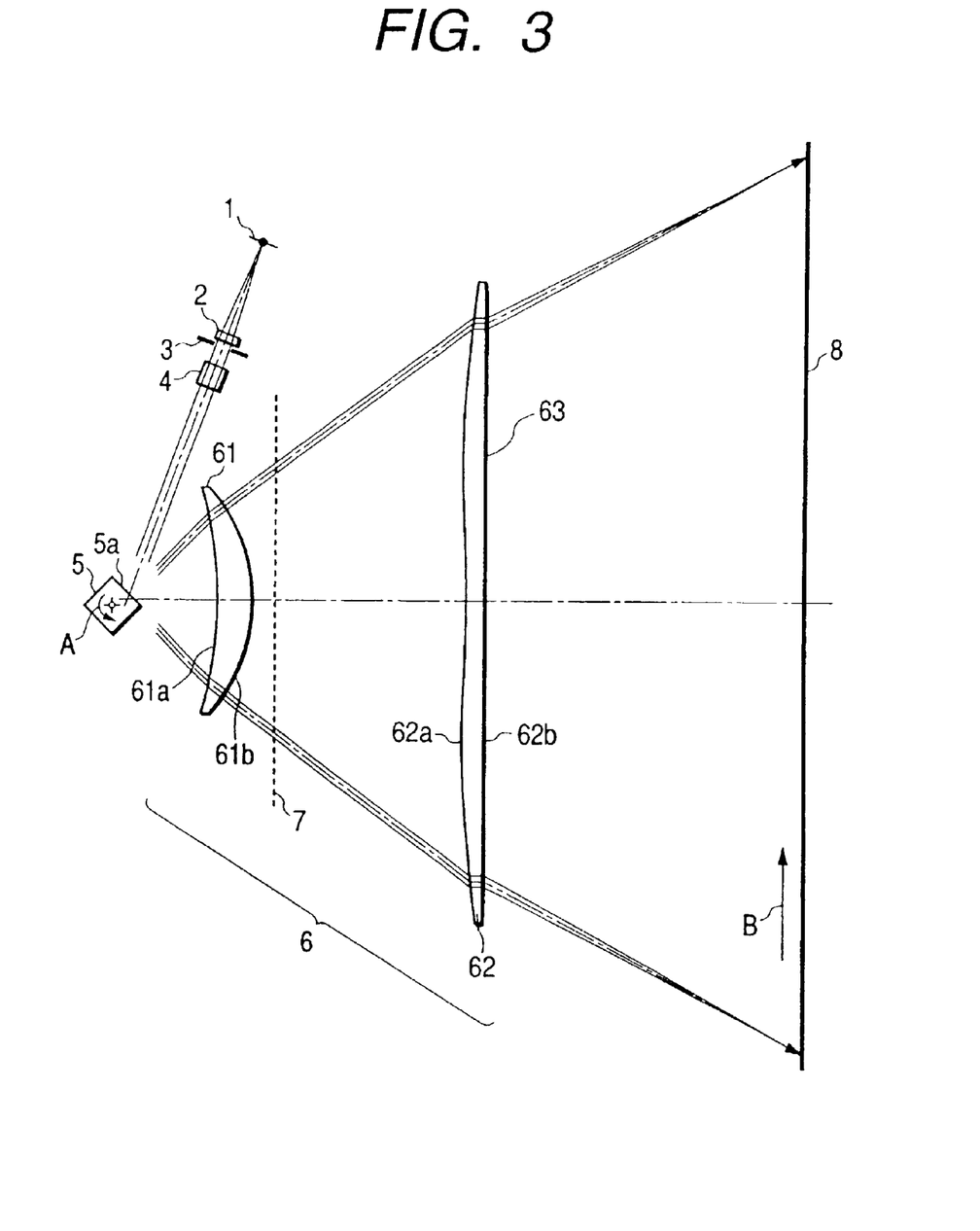
FIG. 3 is a schematic cross sectional view of Embodiment 1 of optical scanner according to the invention and taken along the main-scanning direction, illustrating a principal portion thereof, said embodiment being used in an image forming apparatus.
Figure 4:
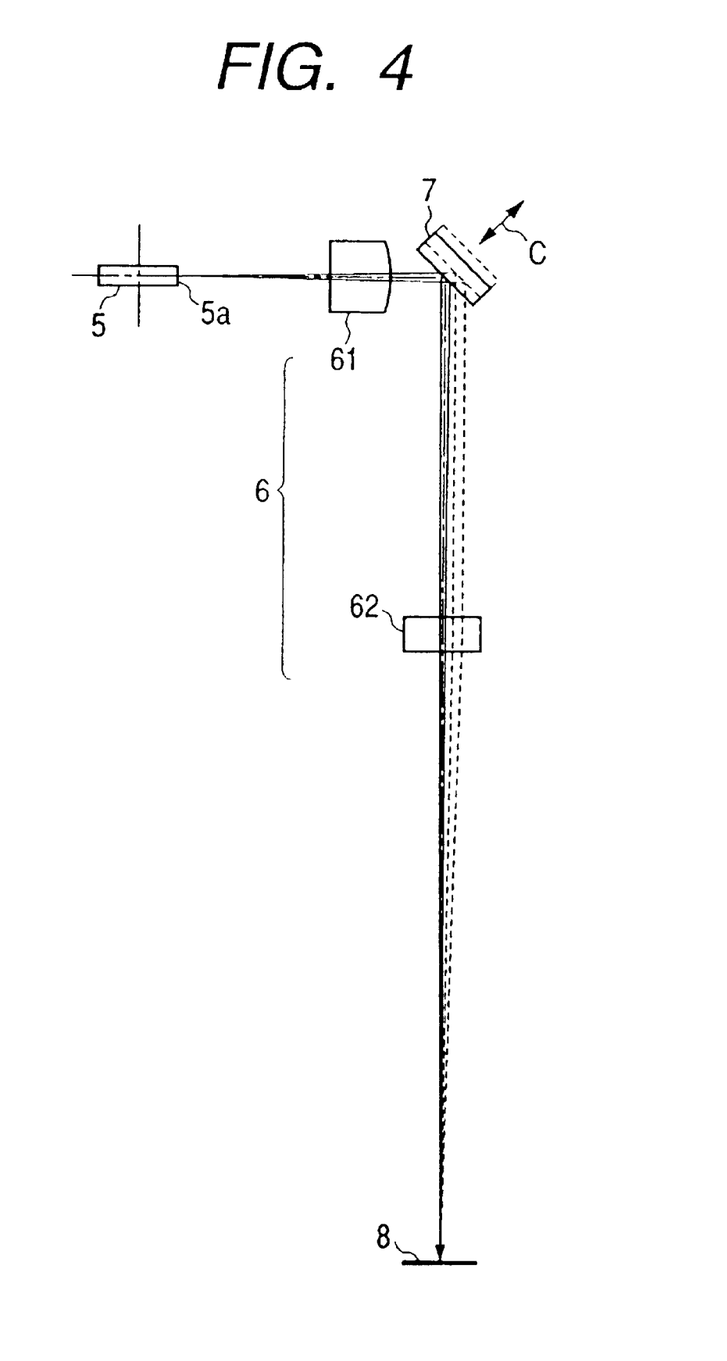
FIG. 4 is a schematic cross sectional view of the image forming apparatus of FIG. 3 taken along the sub-scanning direction, illustrating a principal portion thereof.

FIG. 3 is a schematic cross sectional view of Embodiment 1 of optical scanner according to the invention and taken along the main-scanning direction, illustrating a principal portion thereof, said embodiment being used in an image forming apparatus such as a digital copying machine. FIG. 4 is a schematic cross sectional view of the embodiment of optical scanner of FIG. 3 taken along the sub-scanning direction, illustrating a principal portion thereof.

Referring to FIGS. 3 and 4, there are shown a light source 1 that may typically be a semiconductor laser, a third optical element 2 that is a collimator lens for transforming the divergent light beam emitted from the light source 1 into a substantially collimated light beam, an aperture stop 3 for limiting the width (quantity of light) of the light beam passing therethrough. There are also shown a fourth optical element that is a cylindrical lens (cylinder lens) having a predetermined refractive power only in the sub-scanning direction and focusses the light beam passing through the aperture stop 3 onto the deflecting surface (reflecting surface) 5a of optical deflector 5, which will be described hereinafter, to produce a substantially linear image in the sub-scanning section.

In FIGS. 3 and 4, reference symbol 5 denotes a deflection element, or an optical deflector, that may typically be a rotary polygon mirror adapted to be driven by a drive means such as a motor (not shown) to rotate in the sense of arrow A in FIG. 3 at a constant rate.

Reference symbol 6 denotes a scanning optical system (imaging optical system) having an fθ feature and comprising a first optical element that is a refraction element 61 and a second optical element that is a diffraction element 62. The refraction element 61 is formed by a single plastic toric lens whose refractive power differs between the main-scanning direction and the sub-scanning direction. Both lens surfaces 61a and 61b of the toric lens 61 have an aspherical profile in the main-scanning direction.

The diffraction element 62 is an oblong plastic element whose power differs between the main-scanning direction and the sub-scanning direction. The surface 62a of the oblong diffraction element 62 through which light enters the element is aspherical and shows a predetermined power only in the main-scanning direction (and no power in the sub-scanning direction), whereas the surface 62b of the diffraction element 62 through which light leaves the element is a diffraction surface realized by adding a diffraction grating 63 to a plane.

The refraction element 61 of this embodiment is arranged on the optical path between the optical deflector 5 and a fold mirror 7 operating as reflector, which will be described hereinafter. The diffraction element 62 of this embodiment, on the other hand, is arranged on the optical path between the fold mirror 7 and the surface to be scanned (of an image carrier) 8. The refraction element 61 and the diffraction element 62 are so arranged that the front focal point of the refraction element 61 is located close to the deflecting surface 5a of the optical deflector 5 and the rear focal point of the diffraction element 62 is located close to the surface to be scanned 8 as viewed in the sub-scanning section.

Preferably, the diffraction grating 63 shows a profile same as that of a Fresnel grating having a sawteeth surface produced by cutting or that of a diffraction grating having a stepped surface obtained by photoetching. While the oblong diffraction element 62 of this embodiment is prepared by injection molding of a plastic material, it may alternatively be prepared by using a glass substrate and a technique of forming a replica to produce a similar effect.

In this embodiment, the toric lens 61 is arranged at the side of the optical deflector 5 and the oblong diffraction element 62 is arranged at the side of the surface to be scanned 8 as viewed from the middle point between the axis of rotation of the optical deflector 5 and the surface to be scanned 8. As described above, the power of each of the optical elements differs between the main-scanning direction and the sub-scanning direction. The optical elements are designed to focus the deflected light beam from the optical deflector 5 on the surface to be scanned 8 and, at the same time, establish an optically conjugated relationship between the deflecting surface 5a of the optical deflector 5 and the surface to be scanned 8 in order to compensate any possible inclination of the deflecting surface 5a.

In FIGS. 3 and 4, reference symbol 7 denotes a fold mirror that is a reflection means arranged on the optical path between the toric lens 61 and the oblong diffraction element 62 and adapted to deflect (reflect) the incident light beam in the sub-scanning section and reference symbol 8 denotes the surface to be scanned (of an image carrier which is a photosensitive drum). The above optical elements including the fold mirror 7 are fitted to the inside of a single cabinet referred to as optical cabinet (not shown), which is by turn fitted to the frame of the main body of the optical scanner.

The divergent light beam emitted from the light source 1 is transformed into a substantially collimated light beam by the collimator lens 2 and then the width (quantity of light) of the light beam is limited by the aperture stop 3 before the light beam enters the cylindrical lens 4. The substantially collimated light beam that enters the cylindrical lens 4 then leaves it without being modified in the main-scanning section but is converged in the sub-scanning section so that it is focussed on the deflection surface 5a of the optical deflector 5 to produce a substantially linear image (running along the main-scanning direction). The light beam deflected by the deflection surface 5a of the optical deflector 5 is then led to the surface of the photosensitive drum 8 by way of the fold mirror 7 and the oblong diffraction element 62 to optically scan the surface of the photosensitive drum 8 in the direction of arrow B (main-scanning direction). As a result, an image is recorded on the surface of the photosensitive drum operating as recording medium.

The profile of the refracting plane of the toric lens 61 and that of the diffracting plane of the oblong diffraction element 62 of the scanning optical system (imaging optical system) are expressed respectively by the following formulas.

Firstly, the refracting plane of the toric lens 61 is aspherical in the main-scanning direction and expressed by means of a function up to the tenth degree. Assuming a three-dimensional coordinate system having the original point located at the intersection of the refracting plane and the optical axis and the x-axis running along the optical axis while the y-axis running perpendicularly relative to the optical axis in the main-scanning section and the z-axis running perpendicularly relative to the optical axis in the sub-scanning section. Then, a direction of the major axis corresponding to the main-scanning direction is expressed by formula (1) below;

$$X = \frac{Y^2/R}{1+(1-(1+K)(Y/R^2))^{1/2}} + B_4Y^4 + B_6Y^6 + B_8Y^8 + B_{10}Y^{10}, \quad (1)$$

where R represents the radius of curvature and K, $B_4$, $B_6$, $B_8$ and $B_{10}$ represent respective aspheric coefficients.

On the other hand, the minor axis corresponding to the sub-scanning direction is expressed by formula (2) below;

$$S = \frac{Z^2/r'}{1+(1-(Z/r')^2)^{1/2}}, \quad (2)$$

where $r'=r_0 \ (1+D_2Y^2+D_4Y^4+D_6Y^6+D_8Y^8+D_{10}Y^{10})$, $r_0$ being the radius of curvature of the manor axis on the optical axis and $D_2$, $D_4$, $D_6$, $D_8$ and $D_{10}$ represent respective aspheric coefficients.

Secondly, the diffracting plane is expressed by means of a topological function up to the sixth degree in the main-scanning direction and a topological function of the second degree in the sub-scanning direction that varies depending on the position in the main-scanning direction.

$$\phi=m\lambda=b_2Y^2+b_4Y^4+b_6Y^6+(d_0+d_1Y+d_2Y^2+d_3Y^3+d_4Y^4)Z^2 \quad (3),$$

where $\phi$ represents the topological function, m represents the degree of diffraction and $\lambda$ represents the wavelength to be used, while Y represents the height from the optical axis and $b_2$, $b_4$, $b_6$, $d_0$, $d_1$, $d_2$, $d_3$ and $d_4$ represent respective topological coefficients. Note that diffracted light of the +1 degree is used in the Embodiments 1, 2 and 3 of the present invention.

Table 1 illustrates the optical arrangement of the principal optical elements, the aspheric coefficients of the toric lens 61 and the aspheric coefficients and the topological terms of the oblong diffraction element 62 of this embodiment.

As described above and shown in Table 1, the front focal point of the toric lens 61 is located close to the deflecting surface 5a of the optical deflector 5 and the rear focal point of the oblong diffraction element 62 is located close to the surface to be scanned 8 in the sub-scanning section in this embodiment. Thus, the light beam entering the fold mirror 7 is substantially collimated in the sub-scanning section. Therefore, if the fold mirror 7 is vibrated in the direction of arrow C (direction of primary oscillation) in FIG. 4, the light beam entering the oblong diffraction element 62 always gets to a position close to the optical axis of the diffraction element 62 on the surface to be scanned 8 as indicated by a dotted line in FIG. 4.

If the rear focal length of the oblong diffraction element 62 in the sub-scanning section is $f_{2s}$ and the distance between the rear principal plane of the oblong diffraction element 62 and the surface to be scanned 8 is $h_{2s}$, they satisfy the requirement expressed by formula (4) below.

$$0.5<h_{2s}/f_{2s}<2.0 \quad (4),$$

If the ratio of $h_{2s}/f_{2s}$ is 1.0 in the formula (4) above, it is possible to completely eliminate the displacement of the scanning spot in the sub-scanning direction due to oscillation of the fold mirror 7. The displacement of the scanning spot is corrected excessively if the ratio of $h_{2s}/f_{2s}$ is greater than 1.0, whereas it will be corrected insufficiently if the ratio of $h_{2s}/f_{2s}$ is smaller than 1.0. However, the rear focal point is found close to the surface to be scanned 8 so long as the requirement of formula (4) above is met so that the displacement of the scanning spot can be reduced to a practically feasible level.

In this embodiment, the value of $$h_{2s}/f_{2s}=1.135$$

is selected to satisfy the requirement of formula (4) and reduce the displacement of the scanning spot due to the oscillation of the fold mirror 7.

Figure 5:
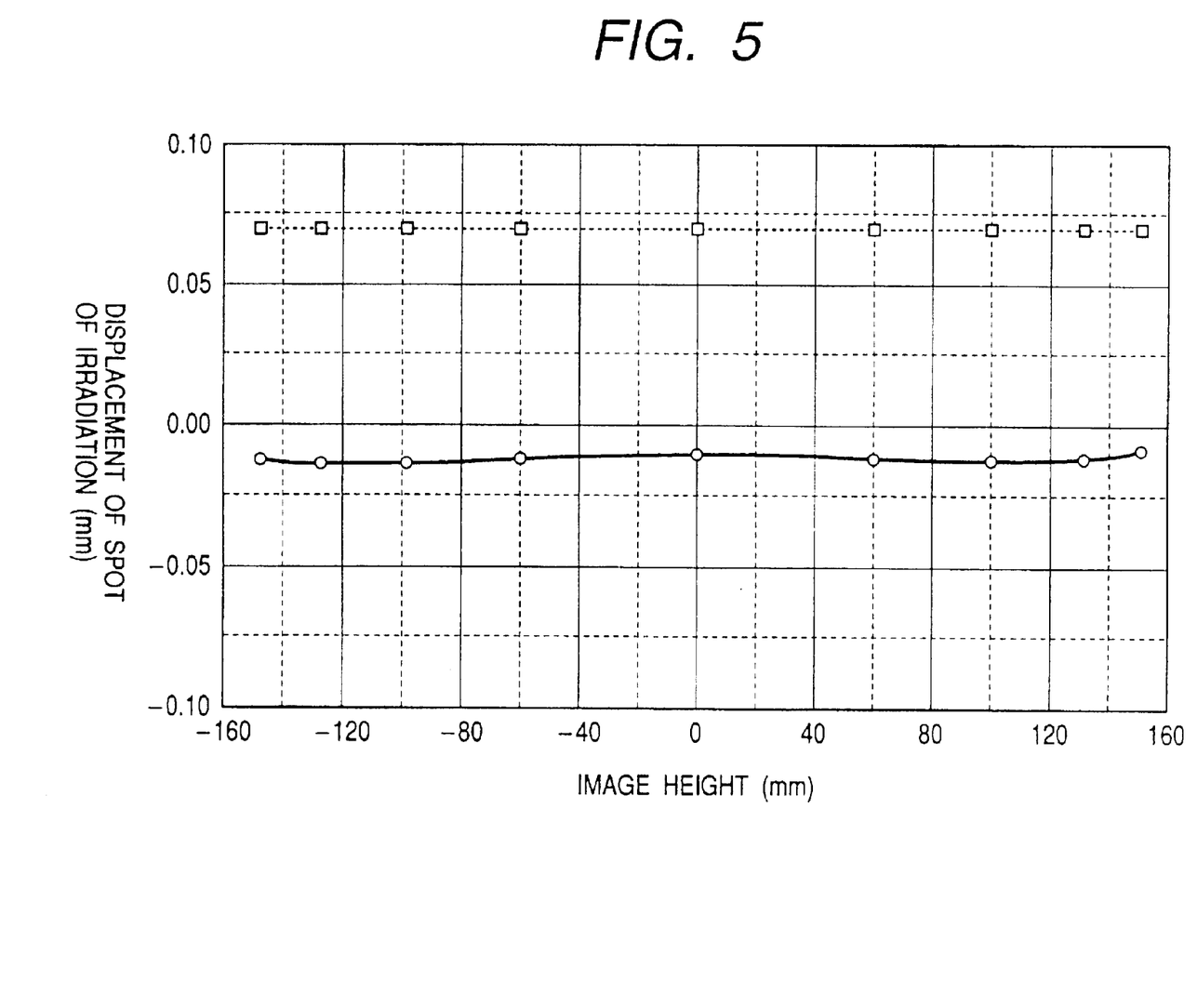
FIG. 5 is a graph showing the displacement of the scanning spot produced by the oscillation of the fold mirror in the optical scanner of FIGS. 3 and 4.

FIG. 5 is a graph showing the displacement of the scanning spot per unit amplitude (0.1 mm) of the oscillation of the fold mirror 7 in the Embodiment 1. In FIG. 5, the horizontal axis represents the image height while the vertical axis represents the displacement of the spot of irradiation (mm). Additionally, in FIG. 5, the solid line shows how the scanning spot of Embodiment 1 is displaced, whereas the dotted line shows the displacement of the scanning spot of an optical scanner of a known type observed for the purpose of comparison (where the fold mirror is placed between the oblong diffraction element and the surface to be scanned and the light beam is deflected rectangularly in the sub-scanning section). From FIG. 5, it will be clear that the displacement of the scanning spot due to the oscillation of the fold mirror 7 is remarkably reduced in Embodiment 1 if compared with the known optical scanner used for the purpose of comparison.

Additionally, Embodiment 1 is provided with a temperature compensation feature of compensating the fluctuations of the focal point due to fluctuations of the refractive index of the plastic material of the toric lens 61 and that of the oblong diffraction element 62 by way of fluctuations of the wavelength of the light beam from the light source (semiconductor laser) 1.

Still additionally, Embodiment 1 is also provided with a movement regulation mechanism (not shown) for the fold mirror 7. This mechanism is used to regulate the posture of the fold mirror 7 in order to make the light beam to be properly deflected by the fold mirror 7 and enter the diffraction element 62 along the optical axis of the optical system.

While a diffraction element is used for the scanning optical system (imaging optical system) 6 in this embodiment, the influence of the oscillation of the fold mirror can be reduced if an ordinary refraction element is used so long as the positional arrangement of the components of this embodiment is observed.

As described above, this embodiment can correct the displacement of the scanning spot in the sub-scanning section due to the oscillation of the fold mirror 7 to produce a high quality image that is free from an irregular pitch of scanning lines without resorting to costly antivibration means for the main frame and/or the optical cabinet of the optical scanner.

Embodiment 2

Figure 6:
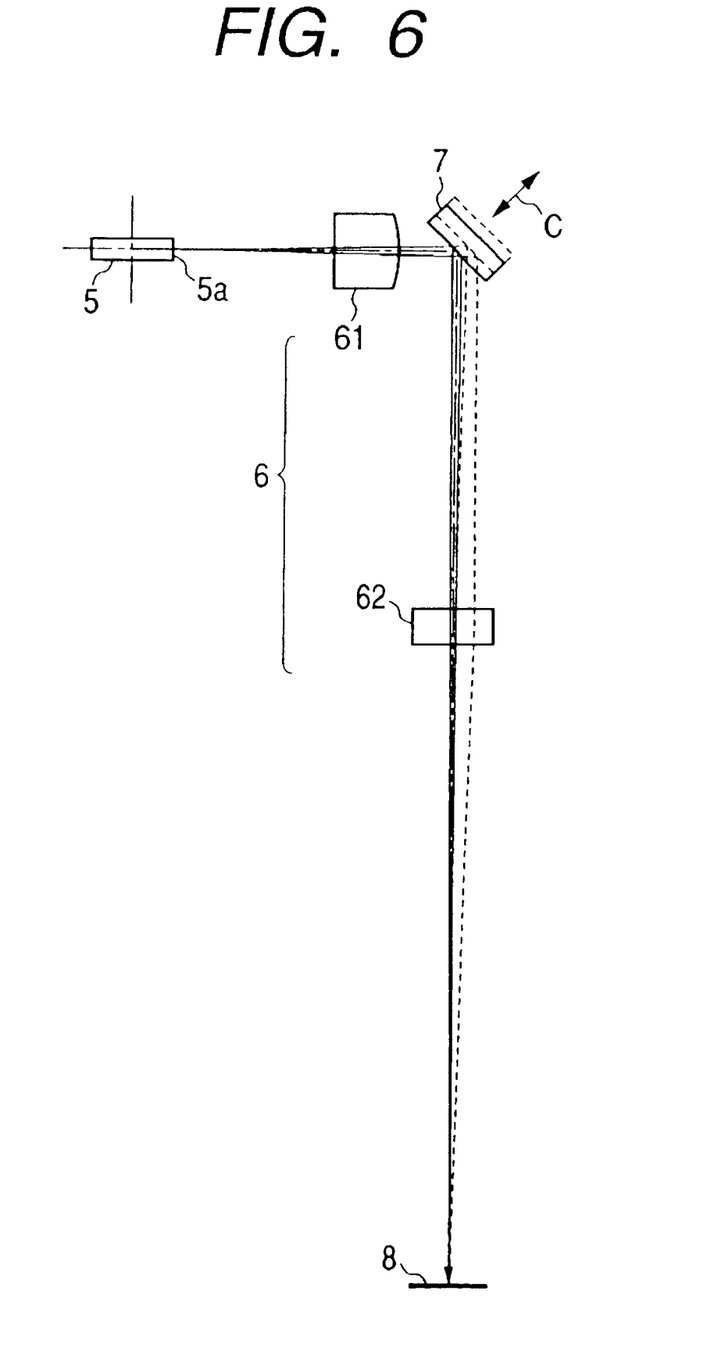
FIG. 6 is a schematic cross sectional view of Embodiment 2 of optical scanner according to the invention and taken along the sub-scanning direction, illustrating a principal portion thereof, said embodiment being used in an image forming apparatus.

FIG. 6 is a schematic cross sectional view of Embodiment 2 of optical scanner according to the invention and taken along the sub-scanning direction, illustrating a principal portion thereof, said embodiment being used in an image forming apparatus such as a digital copying machine. In FIG. 6, the components same as those of FIG. 4 are denoted respectively by the same reference symbols and will not be described any further.

This embodiment differs from the above described Embodiment 1 in that the power arrangement of the scanning optical system (imaging optical system) is modified from that of Embodiment 1 in the sub-scanning direction. Therefore, the influence of the oscillation of the fold mirror 7 and other optical characteristics of this embodiment also differ from those of Embodiment 1. Otherwise, Embodiment 2 is identical with Embodiment 1 in terms of configuration and optical effect and hence the two embodiment operate substantially in a similar way.

Thus, the light beam striking the fold mirror 7 of this embodiment is substantially collimated (slightly divergent) in the sub-scanning section. Therefore, as shown in FIG. 6, if the fold mirror 7 is vibrated in the direction of arrow C in FIG. 6 (direction of primary oscillation), the light beam entering the oblong diffraction element 62 always gets to the surface to be scanned 8 at a position located close to the optical axis of the oblong diffraction element 62 as indicated by the dotted line in FIG. 6.

If the rear focal length of the oblong diffraction element 62 in the sub-scanning section is $f_{2s}$ and the distance between the rear primary plane of the oblong diffraction element 62 and the surface to be scanned 8 is $h_{2s}$, the ratio of $$h_{2s}/f_{2s}=1.584$$

is selected to satisfy the requirement of formula (4) and reduce the displacement of the scanning spot in the sub-scanning direction due to the oscillation of the fold mirror 7.

Table 2 illustrates the optical arrangement of the principal optical elements, the aspheric coefficients of the toric lens 61 and the aspheric coefficients and the topological terms of the oblong diffraction element 62 of this embodiment.

Figure 7:
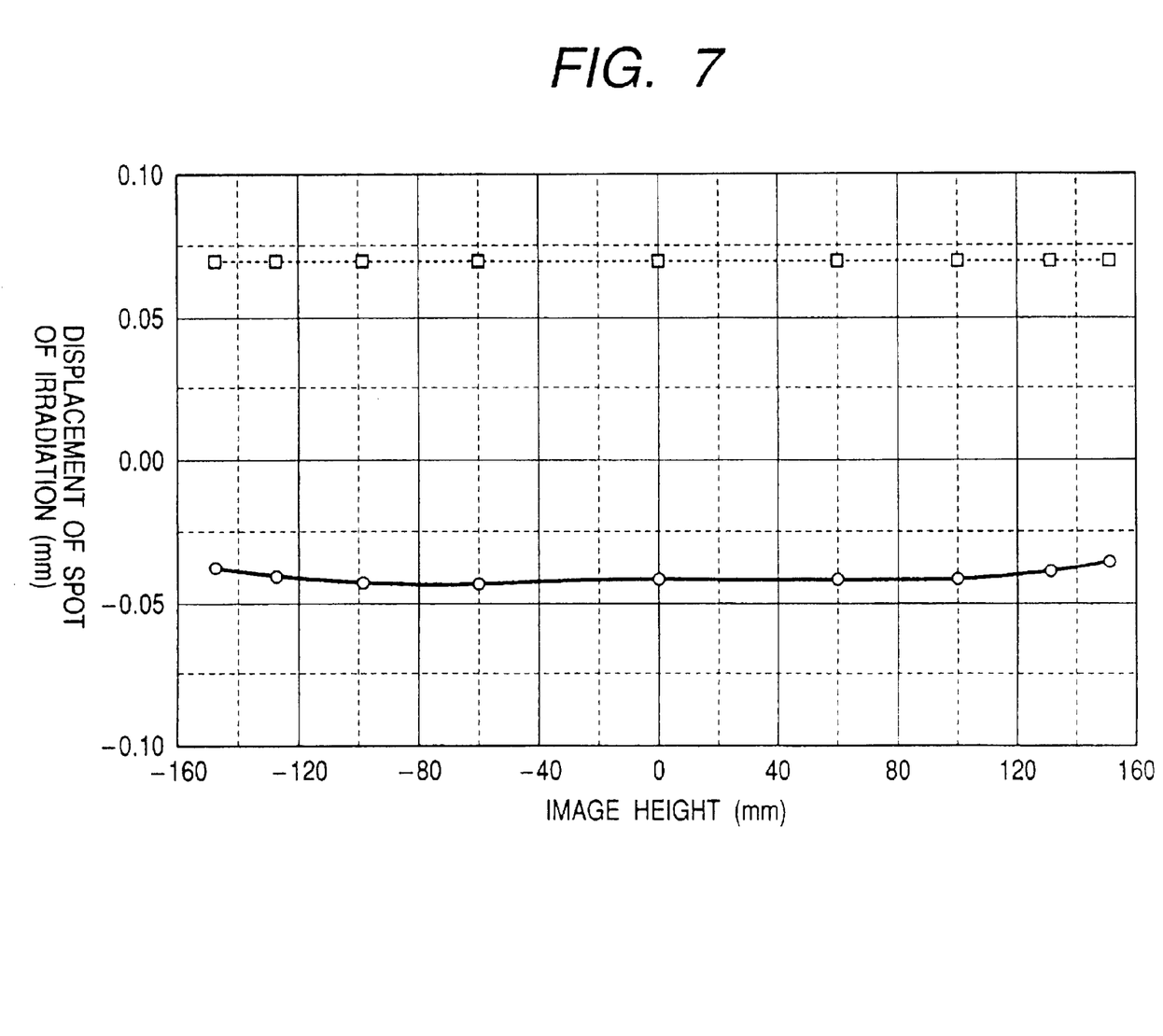
FIG. 7 is a graph showing the displacement of the scanning spot produced by the oscillation of the fold mirror in the image forming apparatus of FIG. 6.

FIG. 7 is a graph showing the displacement of the scanning spot per unit amplitude (0.1 mm) of the oscillation of the fold mirror 7 in the Embodiment 2. In FIG. 7, the horizontal axis represents the image height (mm) while the vertical axis represents the displacement of the spot of irradiation (mm). Additionally, in FIG. 7, the solid line shows how the scanning spot of Embodiment 2 is displaced, whereas the dotted line shows the displacement of the scanning spot of an optical scanner of a known type observed for the purpose of comparison (where the fold mirror is placed between the oblong diffraction element and the surface to be scanned and the light beam is deflected rectangularly in the sub-scanning section). From FIG. 7, it will be seen that the displacement of the scanning spot due to the oscillation of the fold mirror 7 is remarkably and slightly excessively corrected in Embodiment 2 if compared with the known optical scanner used for the purpose of comparison.

As described above, this embodiment can correct the displacement of the scanning spot in the sub-scanning section due to the oscillation of the fold mirror 7 to produce a high quality image that is free from an irregular pitch of scanning lines without resorting to costly antivibration means for the main frame and/or the optical cabinet of the optical scanner.

Additionally, this embodiment is intrinsically characterized in that the hypersensitivity of the optical system is reduced to facilitate the preparation of the optical system by means of a molding process by raising the power of the oblong diffraction element 62 in the sub-scanning direction and reducing the magnification of the scanning optical system (imaging optical system) 6.

Embodiment 3

Figure 8:
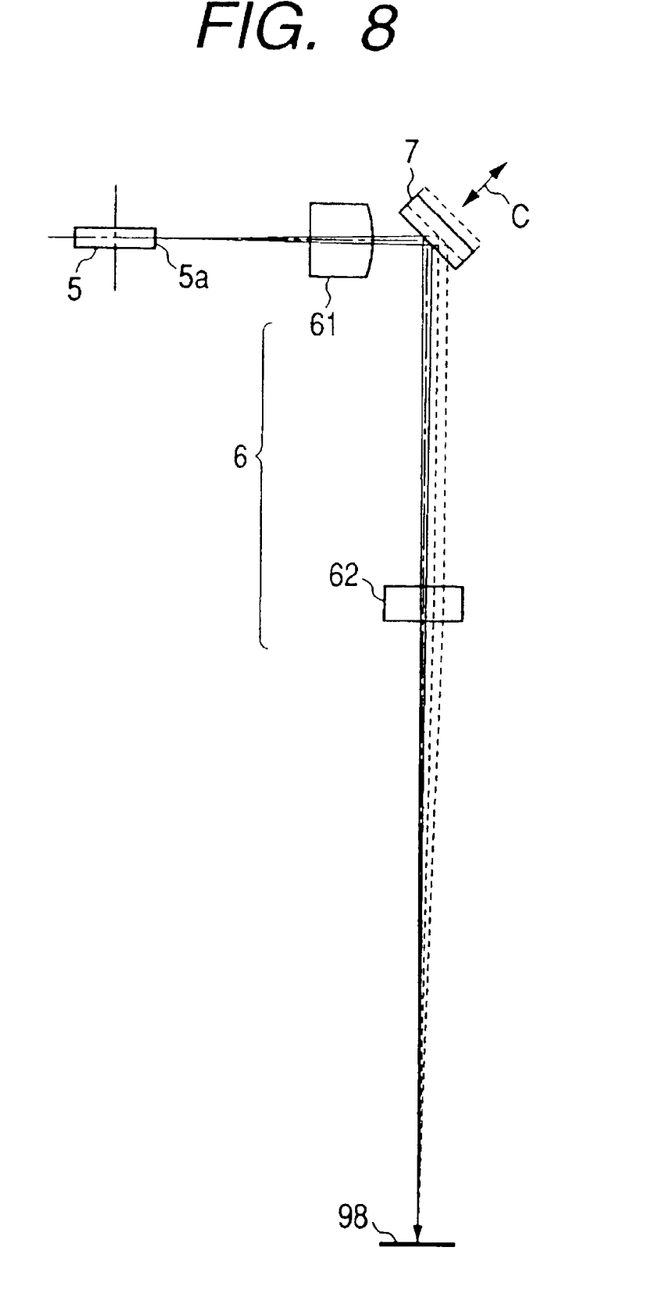
FIG. 8 is a schematic cross sectional view of Embodiment 3 of optical scanner according to the invention and taken along the sub-scanning direction, illustrating a principal portion thereof, said embodiment being used in an image forming apparatus.

FIG. 8 is a schematic cross sectional view of Embodiment 3 of optical scanner according to the invention and taken along the sub-scanning direction, illustrating a principal portion thereof, said embodiment being used in an image forming apparatus such as a digital copying machine. In FIG. 8, the components same as those of FIG. 4 are denoted respectively by the same reference symbols and will not be described any further.

This embodiment differs from the above described Embodiment 1 in that the power arrangement of the scanning optical system (imaging optical system) 6 is modified from that of Embodiment 1 in the sub-scanning direction. Therefore, the influence of the oscillation of the fold mirror 7 and other optical characteristics of this embodiment also differ from those of Embodiment 1. Otherwise, Embodiment 3 is identical with Embodiment 1 in terms of configuration and optical effect and hence the two embodiment operate substantially in a similar way.

Thus, the light beam striking the fold mirror 7 of this embodiment is substantially collimated (slightly divergent) in the sub-scanning section. Therefore, as shown in FIG. 8, if the fold mirror 7 is vibrated in the direction of arrow C in FIG. 8 (direction of primary oscillation), the light beam entering the oblong diffraction element 62 always gets to the surface to be scanned 8 at a position located close to the optical axis of the diffraction element 62 as indicated by the dotted line in FIG. 8.

If the rear focal length of the oblong diffraction element 62 in the sub-scanning direction is $f_{2s}$ and the distance between the rear principal plane of the oblong diffraction element 62 and the surface to be scanned 8 is $h_{2s}$, the value of $$h_{2s}/f_{2s}=0.694$$

is selected to satisfy the requirement of formula (4) and reduce the displacement of the scanning spot in the sub-scanning direction due to the oscillation of the fold mirror 7.

Table 3 illustrates the optical arrangement of the principal optical elements, the aspheric coefficients of the toric lens 61 and the aspheric coefficients and the topological terms of the oblong diffraction element 62 of this embodiment.

Figure 9:
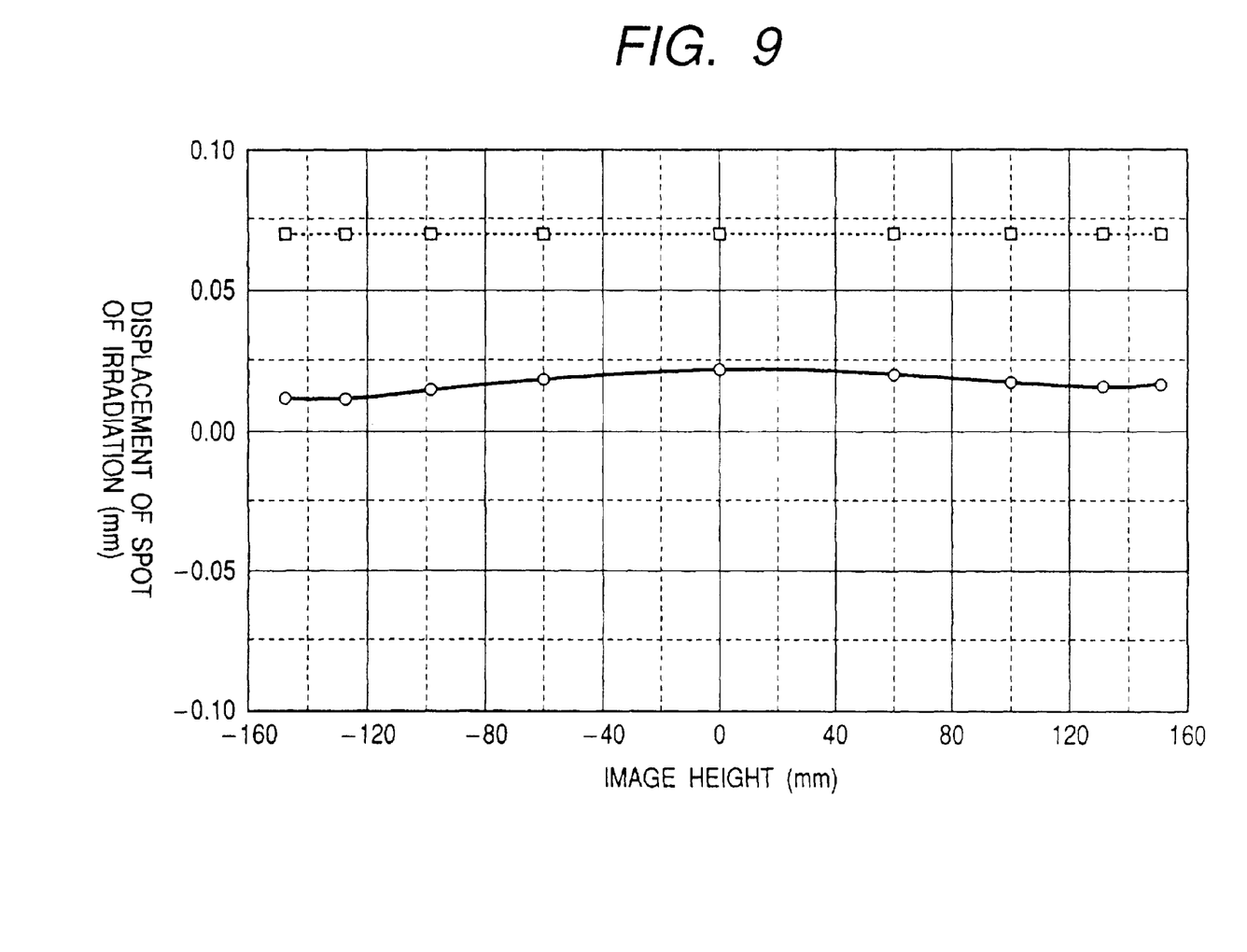
FIG. 9 is a graph showing the displacement of the scanning spot produced by the oscillation of the fold mirror in the image forming apparatus of FIG. 8.

FIG. 9 is a graph showing the displacement of the scanning spot per unit amplitude (0.1 mm) of the oscillation of the fold mirror 7 in the Embodiment 3. In FIG. 9, the horizontal axis represents the image height while the vertical axis represents the displacement of the spot of irradiation (mm). Additionally, in FIG. 9, the solid line shows how the scanning spot of Embodiment 3 is displaced, whereas the dotted line shows the displacement of the scanning spot of an optical scanner of a known type observed for the purpose of comparison (where the fold mirror is placed between the oblong diffraction element and the surface to be scanned and the light beam is deflected rectangularly in the sub-scanning section). From FIG. 9, it will be seen that the displacement of the scanning spot due to the oscillation of the fold mirror 7 is remarkably and slightly insufficiently corrected in Embodiment 3 if compared with the known optical scanner used for the purpose of comparison.

As described above, this embodiment can correct the displacement of the scanning spot in the sub-scanning section due to the oscillation of the fold mirror 7 to produce a high quality image that is free from an irregular pitch of scanning lines without resorting to costly antivibration means for the main frame and/or the optical cabinet of the optical scanner.

Additionally, this embodiment is intrinsically characterized in that the efficiency of using the semiconductor laser 1 can be improved without using a specifically designed optical system for leading light to the deflection element 5 by relatively reducing the power of the oblong diffraction element 62 in the sub-scanning direction and raising the magnification of the scanning optical system (imaging optical system).

While a semiconductor laser adapted to emit a single light beam is used as a light source in Embodiments 1 through 3, the present invention is by no means limited thereto and a multibeam semiconductor laser adapted to emit a plurality of light beams simultaneously may alternatively be used for the purpose of the invention.

Additionally, while the scanning optical system 2 is made to comprise a pair of scanning optical elements in Embodiments 1 through 3, it may alternatively comprise three or more than three scanning optical elements.

Figure 10:
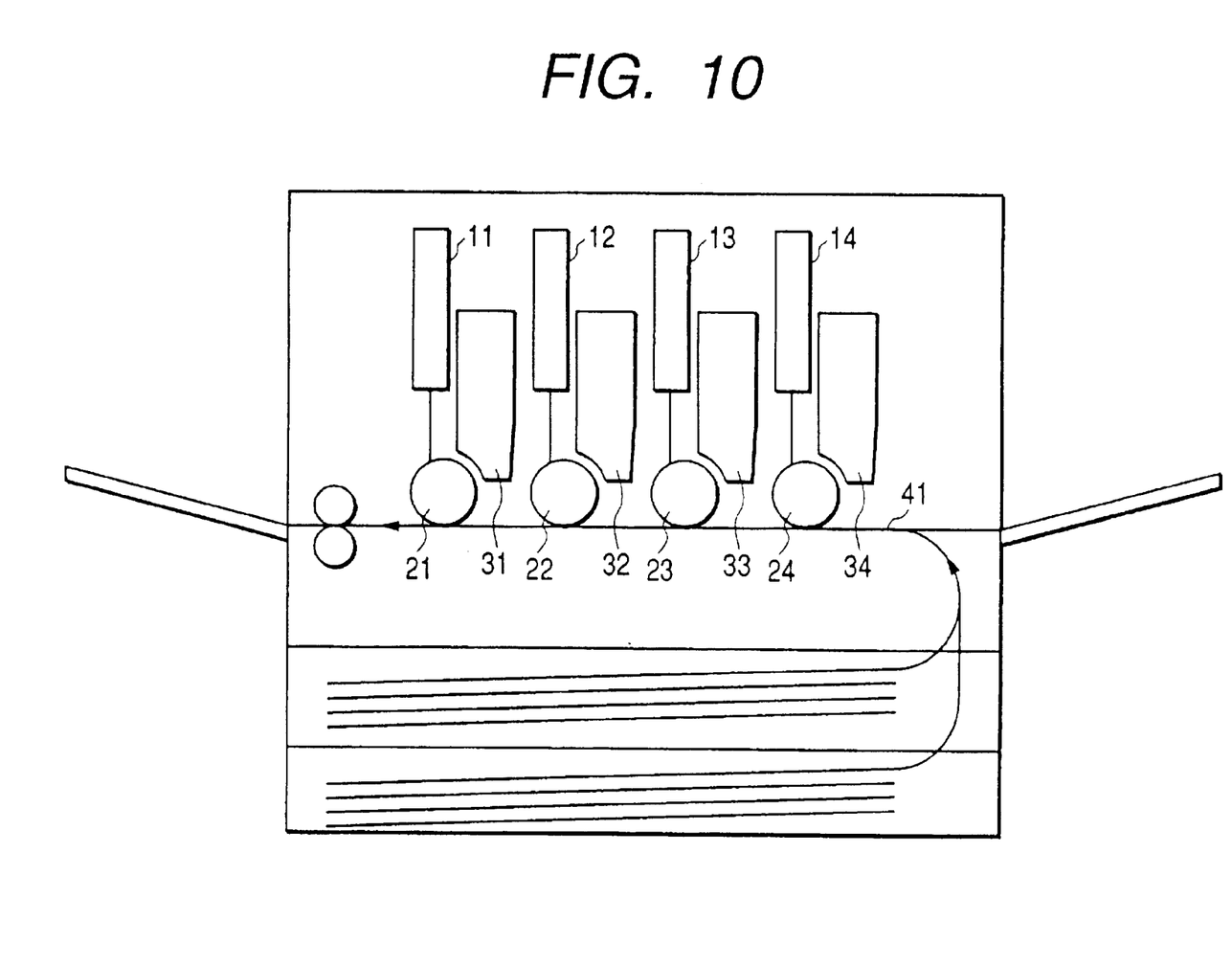
FIG. 10 is a schematic cross sectional view of a color image forming apparatus obtained by applying the present invention, illustrating a principal portion thereof.

The configuration of an image forming apparatus according to the invention is not limited to the above described one. Alternatively, a color image forming apparatus may be so realized as to comprise a plurality of optical scanners according to the invention and the same number of image carriers as shown in FIG. 10. Then, the light beams emitted from the optical scanners are led to the respective image carriers to scan the surfaces thereof in different colors in order to produce a full color image.

In FIG. 10, reference symbols 11, 12, 13 and 14 denote respective optical scanners and reference symbols 21, 22, 23 and 24 denote respective image carriers, whereas reference symbols 31, 32, 33 and 34 denote respective developing devices and reference symbol 41 denotes a conveyor belt.

The present invention can find various applications besides the above described embodiments. The present invention covers any such applications without departing from the scope of the invention specifically defined by the appended claims.

TABLE 1

Embodiment 1

Design Data

| Wavelength, refractive indexes | | | | Surface profile of toric lens 61 | | | Surface profile of oblong diffraction element 62 | |
|---|---|---|---|---|---|---|---|---|
| Wavelength used | λ (nm) | 780 | | First surface | Second surface | | First surface | Second surface |
| Toric lens 61-refractive index | ndt | 1.5306 | R | −8.847E+01 | −4.640E+01 | R | −3.923E+02 | ∞ |
| ↑ -Abbe's number | vdt | 55.5 | K | −5.392E−01 | −8.460E−01 | K | −6.016E+01 | |
| Oblong diffraction element 62 -refractive index | ndd | 1.5306 | B4 | 1.160E−06 | 3.123E−07 | B4 | 2.118E−07 | |
| ↑ -Abbe's number | vdd | 55.5 | B6 | 1.345E−09 | 5.202E−10 | B6 | −2.037E−11 | |
| Light beam - angles | | | B8 | −1.087E−12 | 5.337E−13 | B8 | 1.135E−15 | |
| Angle of incidence to polygon mirror | θp | −70.0 | B10 | 1.838E−16 | −3.911E−16 | B10 | −2.896E−20 | |
| Maximum angle when exiting from polygon mirror | θe | 45.0 | r | 1.260E+02 | −2.351E+01 | Topological function of oblong diffraction element 62 | | |
| | | | D2s | | 1.426E−04 | | First surface | Second surface |
| Locations | | | D4s | | 4.518E−08 | b2 | | −2.007E−04 |
| Polygon mirror surface -toric lens | e1 | 30.0 | D6s | | −4.913E−12 | b4 | | 1.448E−08 |
| Thickness of toric lens along central axis | d1 | 11.0 | D2e | | 2.165E−04 | b6 | | −2.678E−12 |
| Toric lens -fold mirror | e2 | 12.6 | D4e | | −2.956E−08 | b8 | | 2.301E−16 |
| Fold mirror -oblong diffraction element | e3 | 62.4 | D6e | | 3.635E−11 | b10 | | −7.633E−21 |
| Thickness of oblong diffraction element along central axis | d3 | 5.0 | Suffix "s" indicates the laser side. | | | d0 | | −5.112E−03 |
| Oblong diffraction element -surface to be scanned | e4 | 111.0 | Suffix "e" indicates the side opposite to the laser. | | | d1 | | 1.305E−06 |
| Rear focal length of oblong diffraction element | $f_{4s}$ | 97.82 | "+" of the Y-axis indicates the side opposite to the laser. | | | d2 | | 6.917E−08 |
| Principal plane of oblong element- surface to be scanned | $h_{4s}$ | 111.0 | | | | d3 | | −5.664E−11 |
| Ratio | $h_{4s}/f_{4s}$ | 1.135 | | | | d4 | | 5.167E−13 |

TABLE 2

Embodiment 2

Design Data

| Wavelength, refractive indexes | | | | Surface profile of toric lens 61 | | | Surface profile of oblong diffraction element 62 | |
|---|---|---|---|---|---|---|---|---|
| Wavelength used | λ (nm) | 780 | | First surface | Second surface | | First surface | Second surface |
| Toric lens 61-refractive index | ndt | 1.5306 | R | −8.847E+01 | −4.640E+01 | R | −3.923E+02 | ∞ |
| ↑ -Abbe's number | vdt | 55.5 | K | −5.392E−01 | −8.460E−01 | K | −6.016E+01 | |
| Oblong diffraction element 62 -refractive index | ndd | 1.5306 | B4 | 1.160E−06 | 3.123E−07 | B4 | 2.118E−07 | |

TABLE 2-continued

Embodiment 2

Design Data

| | | | | | | | |
|---|---|---|---|---|---|---|---|
| ↑ -Abbe's number | vdd | 55.5 | B6 | 1.345E−09 | 5.202E−10 | B6 | −2.037E−11 |
| Light beam - angles | | | B8 | −1.087E−12 | 5.337E−13 | B8 | 1.135E−15 |
| Angle of incidence to polygon mirror | θp | −70.0 | B10 | 1.838E−16 | −3.911E−16 | B10 | −2.896E−20 |
| Maximum angle when exiting from polygon mirror | θe | 45.0 | r | 1.490E+02 | −3.458E+01 | Topological function of oblong diffraction element 62 | |
| | | | D2s | | 2.074E−04 | First surface | Second surface |
| Locations | | | D4s | | −1.870E−07 | b2 | −2.007E−04 |
| Polygon mirror surface -toric lens | e1 | 30.0 | D6s | | 8.113E−11 | b4 | 1.448E−08 |
| Thickness of toric lens along central axis | d1 | 11.0 | D2e | | 2.614E−04 | b6 | −2.678E−12 |
| Toric lens -fold mirror | e2 | 12.6 | D4e | | −2.391E−07 | b8 | 2.301E−16 |
| Fold mirror -oblong diffraction element | e3 | 62.4 | D6e | | 1.118E−10 | b10 | −7.633E−21 |
| Thickness of oblong diffraction element along central axis | d3 | 5.0 | Suffix "s" indicates the laser side. | | | d0 | −7.134E−03 |
| Oblong diffraction element -surface to be scanned | e4 | 111.0 | Suffix "e" indicates the side opposite to the laser. | | | d1 | 8.458E−07 |
| Rear focal length of oblong diffraction element | $f_{4s}$ | 70.08 | "+" of the Y-axis indicates the side opposite to the laser. | | | d2 | 1.823E−07 |
| Principal plane of oblong element-surface to be scanned | $h_{4s}$ | 111.0 | | | | d3 | −3.414E−11 |
| Ratio | $h_{4s}/f_{4s}$ | 1.584 | | | | d4 | 4.941E−12 |

TABLE 3

Embodiment 3

Design Data

| | | | | Surface profile of toric lens 61 | | Surface profile of oblong diffraction element 62 | |
|---|---|---|---|---|---|---|---|
| Wavelength, refractive indexes | | | | | | | |
| Wavelength used | λ (nm) | 780 | | First surface | Second surface | First surface | Second surface |
| Toric lens 61-refractive index | ndt | 1.5306 | R | −8.847E+01 | −4.640E+01 | R | −3.923E+02 | ∞ |
| ↑ -Abbe's number | vdt | 55.5 | K | −5.392E−01 | −8.460E−01 | K | −6.016E+01 | |
| Oblong diffraction element 62 -refractive index | ndd | 1.5306 | B4 | 1.160E−06 | 3.123E−07 | B4 | 2.118E−07 | |
| ↑ -Abbe's number | vdd | 55.5 | B6 | 1.345E−09 | 5.202E−10 | B6 | −2.037E−11 | |
| Light beam - angles | | | B8 | −1.087E−12 | 5.337E−13 | B8 | 1.135E−15 | |
| Angle of incidence to polygon mirror | θp | −70.0 | B10 | 1.838E−16 | −3.911E−16 | B10 | −2.896E−20 | |
| Maximum angle when exiting from polygon mirror | θe | 45.0 | r | −1.055E+02 | −1.644E+01 | Topological function of oblong diffraction element 62 | |
| | | | D2s | | 5.727E−05 | First surface | Second surface |
| Locations | | | D4s | | 1.786E−08 | b2 | −2.007E−04 |
| Polygon mirror surface -toric lens | e1 | 30.0 | D6s | | −1.427E−08 | b4 | 1.448E−08 |
| Thickness of toric lens along central axis | d1 | 11.0 | D2e | | 1.101E−04 | b6 | −2.678E−12 |
| Toric lens -fold mirror | e2 | 12.6 | D4e | | −3.794E−08 | b8 | 2.301E−16 |
| Fold mirror -oblong diffraction element | e3 | 62.4 | D6e | | 1.342E−11 | b10 | −7.633E−21 |
| Thickness of oblong diffraction element along central axis | d3 | 5.0 | Suffix "s" indicates the laser side. | | | d0 | −3.126E−03 |
| Oblong diffraction element -surface to be scanned | e4 | 111.0 | Suffix "e" indicates the side opposite to the laser. | | | d1 | 1.743E−06 |
| Rear focal length of oblong diffraction element | $f_{4s}$ | 160.0 | "+" of the Y-axis indicates the side opposite to the laser. | | | d2 | −5.739E−08 |
| Principal plane of oblong element-surface to be scanned | $h_{4s}$ | 111.0 | | | | d3 | −7.455E−11 |
| Ratio | $h_{4s}/f_{4s}$ | 0.694 | | | | d4 | 6.320E−12 |

What is claimed is:

1. An optical scanner comprising:

a light source;

a deflection element for deflecting a light beam emitted from said light source;

an image optical system including at least a first optical element and a second optical element and adapted to focus the light beam deflected by said deflection element onto a surface to be scanned, said second optical element having a positive power in a sub-scanning direction; and a reflector mirror arranged in an optical path between the first optical element and the second optical element to reflect the light beam from the first optical element to the second optical element.

2. An image forming apparatus comprising:

a light source;

a deflection element for deflecting a light beam emitted from said light source;

an imaging optical system including at least a first optical element and a second optical element and adapted to focus the light beam deflected by said deflection element onto a surface to be scanned, said second optical element having a positive power in a sub-scanning direction;

an image carrier arranged at the surface to be scanned by said optical scanner; and a reflector mirror arranged in an optical path between the first optical element and the second optical element to reflect the light beam from the first optical element to the second optical element.

3. A color image forming apparatus comprising:

a plurality of units, each unit including:

an optical scanner including:

a light source;

a deflection element for deflecting a light beam emitted from said light source;

an imaging optical system including at least a first optical element and a second optical element and adapted to focus the light beam deflected by said deflection element onto a surface to be scanned, said second optical element having a positive power in a sub-scanning direction;

a photosensitive body disposed at the surface to be scanned by said optical scanner and adapted to form a latent image thereon as scanned by the light beam;

a developing device for developing the latent image formed on said photosensitive body; and a reflector mirror arranged in an optical path between the first optical element and the second optical element to reflect the light beam from the first optical element to the second optical element, said unit being adapted to form images in different colors, a full color image being formed by synthetically combining the different colors.

* * * * *

UNITED STATES PATENT AND TRADEMARK OFFICE
CERTIFICATE OF CORRECTION

PATENT NO. : 6,793,137 B2
DATED : September 21, 2004
INVENTOR(S) : Manabu Kato

It is certified that error appears in the above-identified patent and that said Letters Patent is hereby corrected as shown below:

Column 1,
Line 60, "cross sectional" should read -- cross-sectional --.

Column 2,
Line 15, "drum) 98" should read -- drum 98) --.
Lines 49, 51, 56 and 63, "cross sectional" should read -- cross-sectional --.

Column 3,
Lines 4, 12, 19 and 24, "cross sectional" should read -- cross-sectional --.
Line 20, "of optical" should read -- of an optical --.

Column 5,
Lines 10 and 18, "below;" should read -- below: --.
Line 63, "below." should read -- below: --.

Column 6,
Line 63, "cross sectional" should read -- cross-sectional --.

Column 7,
Line 4, "above described" should read -- above-described --.

Column 8,
Line 5, "cross sectional" should read -- cross-sectional --.
Line 13, "above described" should read -- above-described --.

Column 10,
Lines 2 and 16, "above described" should read -- above-described --.

Signed and Sealed this

Twenty-second Day of February, 2005

JON W. DUDAS
*Director of the United States Patent and Trademark Office*